Sept. 11, 1962 W. G. DILWORTH 3,053,595
VARIABLE CURVATURE WRIST PIN BEARING
Filed Sept. 1, 1961

INVENTOR.
William G. Dilworth
BY
E. E. James
ATTORNEY

United States Patent Office 3,053,595
Patented Sept. 11, 1962

3,053,595
VARIABLE CURVATURE WRIST PIN BEARING
William G. Dilworth, La Grange, Ill., assignor to General Motors Corporation, Detroit, Mich., a corporation of Delaware
Filed Sept. 1, 1961, Ser. No. 135,626
6 Claims. (Cl. 309—19)

This invention relates to a bearing journal and with regard to certain of its more specific aspects, to a trunnion-type journal connection between a piston and a connecting rod of an internal combustion engine.

In turbocharging or otherwise upgrading existing high speed, high compression engines and in designing new more compact engines to meet the ever increasing demands for more power, the high unit bearing loads necessarily imposed on the limited effective bearing surfaces available in conventional wrist pin type pivotal connections have made it extremely difficult to insure adequate lubrication and wear of these surfaces during power stroke load transmittal.

The instant invention specifically contemplates an improved trunnion-type piston-to-connecting-rod pivotal connection having a hollow, eccentrically bored journal pin presenting a reduced structural section deflective inwardly under high power stroke transmittal to produce a load transmitting bearing profile of reduced curvature, i.e. increased radius of curvature. Such deflection of the trunnion-type journal pin reduces peak load pressure, broadening the load carrying area under any lubrication supply condition, and increases the effective arc and minimum thickness of the lubricating oil film under hydrodynamic conditions. The relatively large difference between the bearing diameter and the basic diameter of the journal permits easy flooding of the clearance cavity therebetween with oil under substantially unloaded conditions. The high conformability of the journal assists in the accommodation of dimensional imperfections and manufacturing tolerances in both the journal and bearing. The load carrying stresses in the journal also tend to remain relatively low during power stroke transmittal since the relatively thin load carrying section is under almost direct compression and the Hertzian contact stresses are minimized by the reduced load carrying curvature.

While the invention has particular application to a piston and connecting rod connection and is herein shown and described with reference to such a journal bearing connection, the invention is not deemed to be so limited. The eccentricity and the diameter of the journal hole with respect to the outside diameter of the journal bearing of the invention, present two degrees of design freedom permitting its general use in meeting the structural and bearing requirements of a wide variety of different mechanisms.

In the past, numerous eccentric curvature bearings and journal bearings have been utilized to improve lubrication, for wear compensation and for assembly purposes. However, the manner in which such bearings have been used has precluded any positive teaching or incidental deflection of the reduced diameter bearing portion to provide improved lubrication and load transmittal characteristics in the manner contemplated in the use of the instant invention.

The foregoing and other objects, advantages and features of the invention will be apparent from the following description of a preferred illustrative embodiment having reference to the accompanying drawing, in which.

Figure 1:
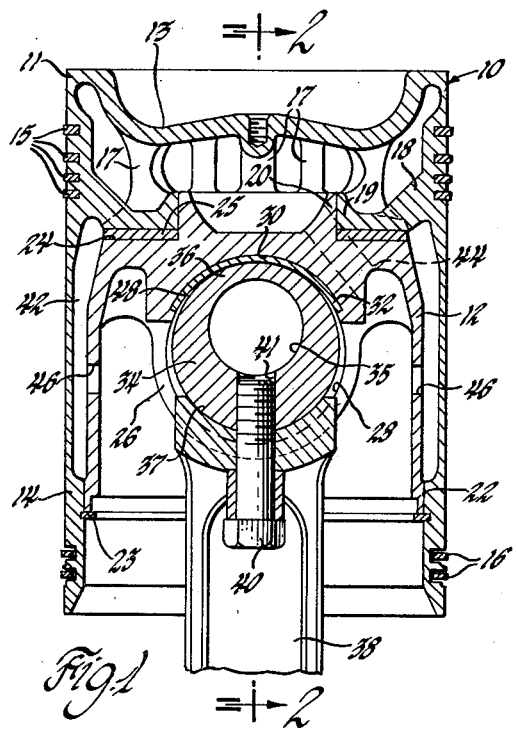
FIGURE 1 is a transverse sectional view of a two-piece piston and connecting rod assembly embodying the invention.
Figure 2:
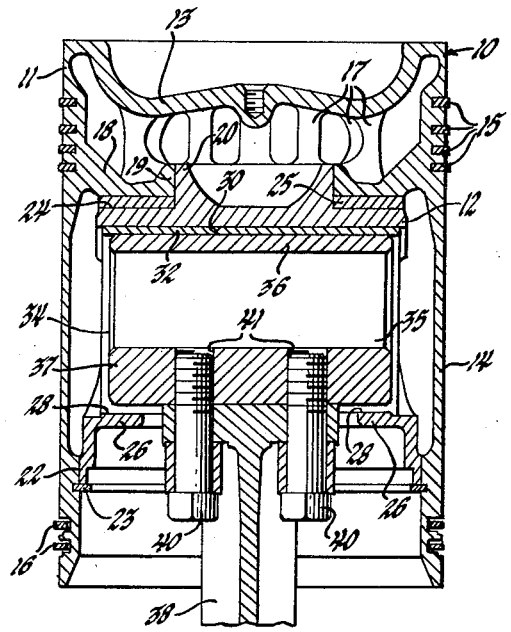
FIGURE 2 is a similar sectional view of the piston and connecting rod assembly of FIGURE 1 and is taken in a plane substantially normal thereto as indicated by the direction of the arrows and the plane of the line 2—2 of FIGURE 1.
Figure 3:
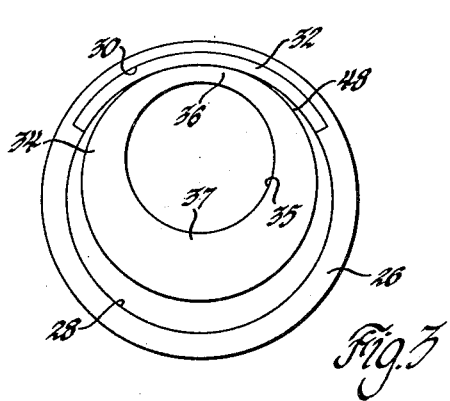
Figure 4:
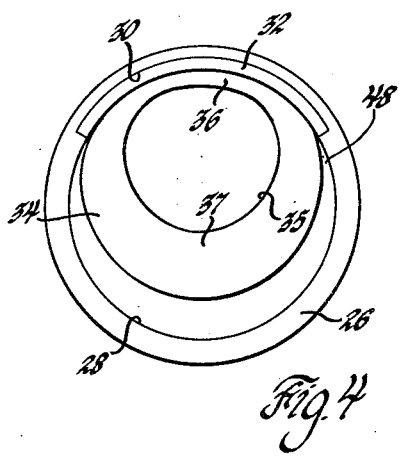
Figure 5:
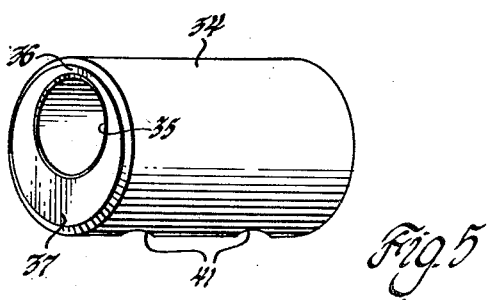

FIGURES 3 and 4 are diagrammatic views illustrating the lubrication and load transmitting characteristics of the trunnion pin pivotal connection of FIGURES 1 and 2 in accordance with the teaching of the invention; and FIGURE 5 is a perspective view of the trunnion journal pin shown in FIGURES 1 and 2.

Referring more particularly to the drawing, the piston and the connecting rod assembly includes a two-piece piston 10 particularly adapted for use in a turbocharged two-cycle internal combustion engine of the compression ignition type. The piston 10 comprises an outer hollow piston member 11 and an inner piston carrier 12. The outer piston member has an upper head portion 13 defining a semi-turbulent torroidal combustion chamber bowl and a cylindrical skirt portion 14 extending longitudinally therefrom. The piston skirt has an upper belt of grooves mounting a plurality of compression rings 15 adjacent the piston head portion and similar grooves mounting oil control rings 16 adjacent the lower end thereof.

The upper load carrying head and compression ring mounting skirt portions are structurally reinforced by a plurality of equiangularly spaced struts 17 and 18 extending longitudinally and radially inwardly, respectively, to an interconnecting annular thrust collar. The thrust collar 19 is spaced longitudinally of the head portion and concentrically inwardly and slightly below the compression ring mounting skirt portion. The struts 17 serve as primary load carrying members and extend longitudinally and arcuately between the bowl portion of the piston head and the annular thrust collar. The struts 18 extend radially and obliquely between the thrust collar and the compression ring mounting skirt portion and serve to provide radial side thrust rigidity between the thrust collar and the compression ring mounting belt portion.

The upper end of the carrier has a reduced diameter cylindrical boss 20 journaled in the central opening of the thrust collar 19. The carrier is journaled adjacent its lower end at 22 within the lower piston skirt portion immediately above the oil ring 16. In assembly, a carrier retaining ring 23 is inserted in an inwardly facing groove formed in the lower piston skirt portion. This ring engages the lower end of the carrier skirt and maintains an annular shoulder 24, extending radially of the carrier from the reduced diameter journal boss 20, in thrust bearing engagement with an annular bearing or washer 25. This thrust bearing in turn engages the thrust collar 19.

The carrier 12 has two diametrically aligned and inwardly extending wrist pin mounting bosses 26 intermediate its ends. These bosses define aligned openings 28 which are intersected by an arcuate relief 30 extending diametrically of the carrier therebetween. The relief 30 slidably mounts a partial bearing insert 32 which is arcuately coextensive with the carrier openings 28. A hollow trunnion-type wrist pin or journal bearing 34 is inserted through and journaled adjacent each end within the carrier defined openings 28 and is adapted to effect and receive primary load transmittal through a lubrication film interposed between its upwardly presented surface and the bearing insert 32.

In accordance with the invention, the wrist pin or journal bearing 34 has substantial bearing clearance with the carrier openings and has an eccentric bore extending longitudinally therethrough. In assembly, this bore is located in the upper portion of the journal pin and thus presents a reduced structural section 36 in bearing engagement with the partial bearing insert 32. This reduced structural section is deformable and resiliently conforms to the internal curvature of the bearing insert under primary power stroke load transmittal. The lower thicker portion 37 of the journal bearing is suitably secured to the flanged upper end of a connecting rod 38 by two bolts 40 which therethrough and threadably engage tapped holes 41 intersecting the thicker journal portion. The journal bearing is thus caused to oscillate through a limited sector by the connecting rod 38 which is connectable at its opposite end to a crank pin of an engine driven crankshaft, not shown.

The piston and carrier members cooperate to define an oil receiving chamber 42 therebetween. The carrier has an obliquely extending passage 44 opening inwardly of its journal boss 20 to the oil receiving chamber and opening downwardly to the space intermediate the journal bearing pin and the carrier skirt. The lower opening of the passage 44 is alignable with an oil jet nozzle which is carried by the engine frame and emits a continuous or intermittent stream of oil into the piston and carrier defined chamber through the passage 44. The oil thus received in the chamber 42 is agitated back and forth by reciprocation of the piston and serves to cool the combustion chamber defining piston head and to lubricate the bearing surfaces of the carrier openings 28, the bearing insert 32 and the journal bearing pin 34. The oil in the chamber 42 is continuously replaced by the oil received through the passage 44 with the excess oil being returned to the engine crankcase through a plurality of ports 46 in the carrier skirt.

Under engine operating conditions, the relatively light loads transmitted between the journal bearing and the bearing insert during the upward compression stroke of the piston are insufficient to cause any substantial deformation of the journal pin. This is shown diagrammatically in FIGURE 3. Under such light load conditions, the relatively large eccentric clearances 48 between the carrier openings 28, the partial bearing 32 and the journal pin 34 permit relative unrestricted supply of oil to the several bearing surfaces. As the piston reaches its top center position shown in FIGURE 1, the combustion impulse and subsequent power stroke impose thrust loads on the piston which are sufficient to resiliently deform the relatively thin upper journal portion 36 causing to conform to the radius of the mating bearing insert as shown diagrammatically in FIGURE 4. As previously indicated, the resultant reduced radius of curvature acts to increase the minimum oil film thickness over a substantially greater effective arc and reduces the peak Hertzian contact pressures. An adequate lubricating oil film is thus provided between the primary load carrying bearing surfaces immediately prior to combustion and is more evenly distributed and maintained by flexure of the journal bearing during the subsequent power stroke. Such load and oil film distributing characteristics substantially increase the durability life of the trunnion journal bearing with consequential reductions and economies in service maintenance and engine repair downtime and permit the uprating of existing engines and the design of new more powerful and compact engines.

While the foregoing description has been limited to a single illustrative embodiment of the invention in a piston and connecting rod pivotal connection, it will be apparent that the journal bearing of the invention is capable of use in other applications and that various modifications might be made therein without departing from the spirit and scope of the invention as defined in the following claims.

What is claimed is:

1. In a piston and connecting rod assembly for an internal combustion engine, a hollow piston member having aligned openings on opposite sides and an arcuate surface coextensive with and extending between said openings, a hollow journal bearing extending between and loosely journaled within said openings and having primary load transmitting engagement with said bearing surface, said journal bearing having an eccentric bore extending longitudinally therethrough and defining a relatively thin wall section adjacent said bearing surface and tapered to a thicker wall section on the opposite side of said journal bearing, a connecting rod secured to the thicker wall section of said journal bearing intermediate its piston supported ends, and means for supplying lubricant to the pivotal bearing surfaces of said piston member and journal bearing, the relatively loose clearances between the bearing surfaces of said piston member and said journal bearing insuring adequate supply of oil therebetween under light load transmitting portions of the engine cycle and the relative thin tapered wall portion of said journal bearing being resiliently deformable by the combustion impulse and subsequent power stroke load transmittal to conform the load carrying curvature of said journal bearing to that of the mating bearing surface thereby increasing the minimum thickness and effective arc of the lubricating oil film and reducing Hertzian contact pressures.

2. A piston and connecting rod assembly for an internal combustion engine comprising a hollow piston member closed at one end and having an arcuate bearing surface coextensive with and extending between aligned openings on opposite sides thereof, a journal bearing extending between and journaled within said openings, said journal bearing having a diameter providing loose bearing clearances with said openings, said journal bearing having an eccentric bore therethrough defining a resilient thin wall portion in primary load transmitting engagement with said bearing surface, and tapering to a thicker wall section on the opposite side of the journal bearing, a connecting rod secured to the thicker wall section of the journal bearing intermediate its piston supported ends, and means for supplying lubricant between the bearing surfaces of the piston member and journal bearing, the thin tapered wall portion of said journal bearing being resiliently deformable during power stroke load transmittal to conform to the load carrying curvature of the mating bearing surface thereby increasing the minimum thickness and effective arc of the lubricating oil film and minimizing peak unit contact pressures therebetween.

3. In a piston and connecting rod assembly for an internal combustion engine, a hollow piston member having aligned openings on opposite sides thereof, a cylindrical bearing member extending between and loosely journaled within said openings, said bearing member having an eccentric bore therethrough defining a relatively thin resilient wall portion in primary load transmitting engagement with the piston member, a connecting rod secured to the bearing member intermediate its piston supported ends, and means for supplying lubricant to the pivotal surfaces of said piston and bearing members, the relative thin wall portion of the bearing member resiliently conforming during power stroke transmittal to the mating load carrying curvature of said journal openings thereby increasing the minimum thickness and effective arc of the lubricating oil film and minimizing peak unit contact pressures therebetween.

4. In a bearing assembly, a first member subjected primarily to unidirectional load transmittal and having an arcuate bearing surface extending transversely of the direction of such primary load transmittal, a cylindrical journal bearing of slightly smaller radius than the curvature of the bearing surface and having an eccentric bore therethrough defining a relatively thin resilient wall section in primary load transmitting engagement with said bearing surface and tapering to a thicker wall section on its opposite side, and means for supplying lubricant to the bearing surfaces of said member and journal bearing, and the relative thin tapered wall portion of the journal bearing conforming resiliently to the load carrying curvature of the mating bearing surface during primary load transmittal thereby increasing the minimum thickness and effective arc of the lubricating oil film and minimizing peak unit contact pressures therebetween.

5. In a bearing assembly subjected to intermittent and substantially unidirectional high load transmittal, a first member having an arcuate bearing surface extending transversely of the direction of load transmittal, a journal bearing in load transmitting engagement with said bearing surface and having a slightly smaller radius of curvature than that of the bearing surface, said journal bearing having an eccentric bore defining a relatively thin resilient wall section engaging said bearing surface and tapered to a thicker wall section on its opposite side, means for supplying lubricant to the bearing surfaces of said member and journal bearing, the relatively loose clearances between the bearing surfaces of said piston member and said journal bearing insuring supply of oil therebetween during light load transmitting periods of operation and the relative thin tapered wall portion of the journal bearing resiliently conforming to the load carrying curvature of the bearing surface during periods of high load transmittal thereby increasing the minimum thickness and effective arc of the lubricating oil film and minimizing unit contact pressures therebetween.

6. In a bearing assembly, a first member subjected primarily to unidirectional load transmittal and having an arcuate bearing surface extending transversely of the direction of such primary load transmittal, a cylindrical journal bearing of slightly smaller radius than the curvature of the bearing surface and having an eccentric bore therethrough defining a relatively thin resilient wall section maintained in primary load transmitting engagement with said bearing surface and tapering to a thicker wall section on its opposite side, the relative thin tapered wall portion of the journal bearing conforming resiliently to the load carrying curvature of the mating bearing surface during primary load transmittal thereby increasing the effective load transmitting arc and minimizing peak unit contact pressures therebetween.

References Cited in the file of this patent

UNITED STATES PATENTS 2,849,265    Ten Eych _____ Aug. 26, 1958